United States Patent
Meyer

[11] Patent Number: 5,845,883
[45] Date of Patent: Dec. 8, 1998

[54] FLEXIBLE CLIP ASSEMBLY

[75] Inventor: Charles Meyer, New Lenox, Ill.

[73] Assignee: Illinois Tool Works Inc., Glenview, Ill.

[21] Appl. No.: 799,483

[22] Filed: Feb. 12, 1997

[51] Int. Cl.$^6$ ....................................................... F16L 3/00
[52] U.S. Cl. .......................... 248/73; 248/74.1; 248/74.2; 248/222.12; 411/508; 411/913
[58] Field of Search ............................... 248/71, 73, 74.1, 248/74.2, 222.12; 24/297, 453, 339; 411/508, 913

[56] References Cited

U.S. PATENT DOCUMENTS

| | | | |
|---|---|---|---|
| 2,014,971 | 9/1935 | Knutson | 248/73 |
| 2,397,680 | 4/1946 | Morehouse | 248/73 |
| 3,157,377 | 11/1964 | Orenick | 248/71 |
| 4,185,800 | 1/1980 | Kabel | 24/453 X |
| 4,334,659 | 6/1982 | Yuda | 248/73 |
| 4,371,137 | 2/1983 | Anscher | 248/73 |
| 4,406,557 | 9/1983 | Suzuki et al. . | |
| 4,438,552 | 3/1984 | Omata | 24/297 X |
| 4,482,265 | 11/1984 | Koza . | |
| 4,591,285 | 5/1986 | Nelson . | |
| 4,915,557 | 4/1990 | Stafford . | |
| 4,934,888 | 6/1990 | Corsmeier et al. . | |
| 5,037,259 | 8/1991 | Duran et al. . | |
| 5,178,479 | 1/1993 | Brown et al. . | |
| 5,336,028 | 8/1994 | Yamamoto . | |
| 5,368,261 | 11/1994 | Caveney et al. | 248/73 |

*Primary Examiner*—Derek J. Berger
*Attorney, Agent, or Firm*—Kane, Dalsimer, Sullivan, Kurucz, Levy, Eisele and Richard, LLP

[57] ABSTRACT

A first embodiment of the invention is a clip assembly which includes a hollow cylindrical portion with an unjoined portion along a longitudinal portion of the periphery. Mating elements are formed on both sides of the unjoined portion. In a mated configuration, the mating elements extend radially from the hollow cylindrical portion. The first mating element includes a distal laterally engaging male mating connector and a distal laterally engaging female mating connector longitudinally adjacent thereto. The second mating element includes similar mating connectors but in reverse order so that the female connector of a mating element engages the male connector of the other mating element. The clip assembly further includes panel thickness adjustment wings peripherally adjacent to the mating connectors. The panel thickness adjustment wings flex to engage structural panels of various thicknesses against detent elements. The second embodiment of the invention is a rod end clip with panel thickness adjustment wings on both sides of a positioning prong. A clip is additionally formed for engaging the rod end, such as a cable.

10 Claims, 2 Drawing Sheets

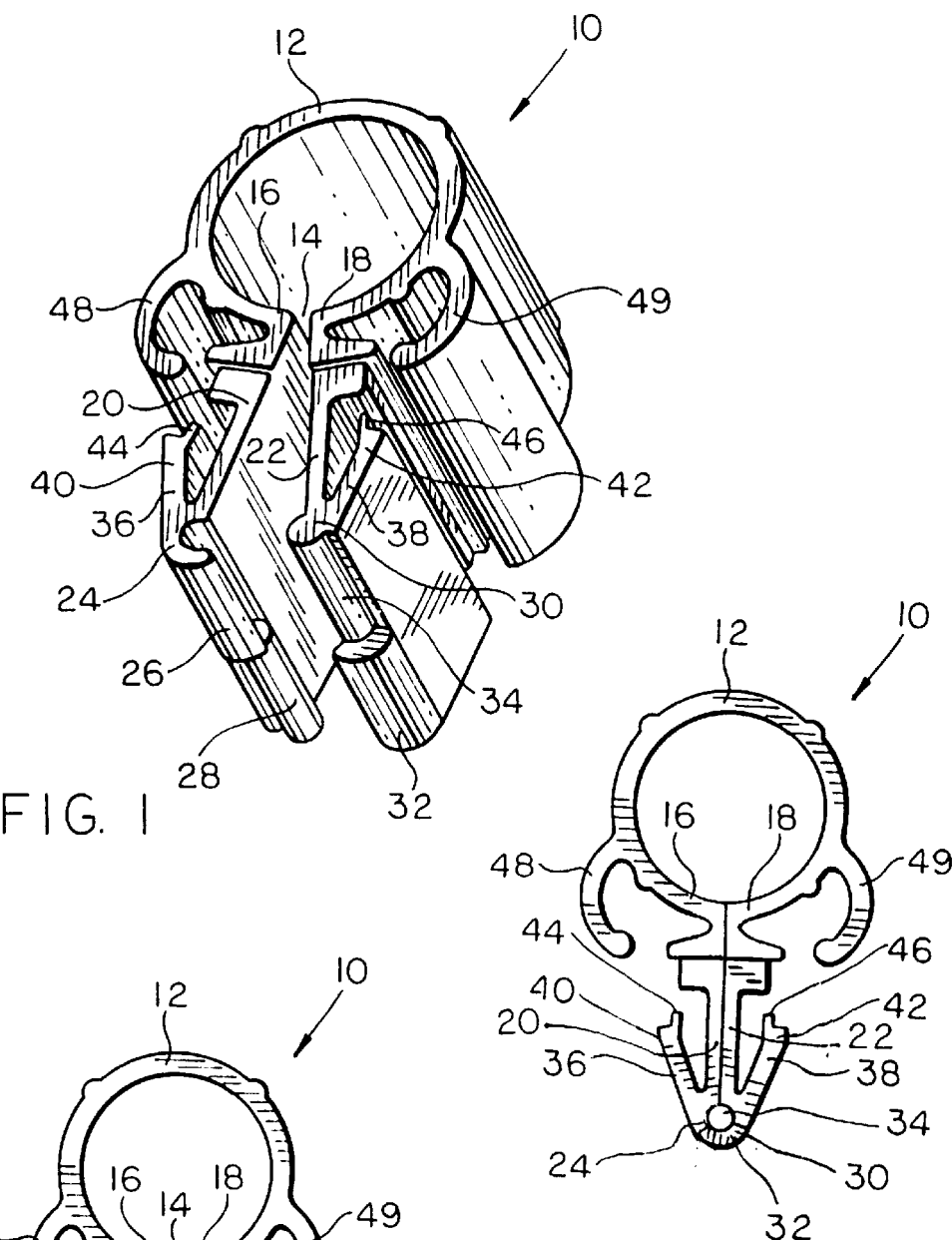
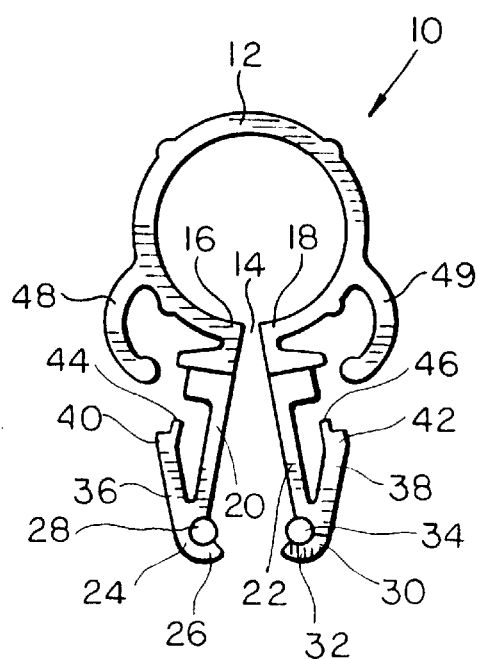

FLEXIBLE CLIP ASSEMBLY

BACKGROUND OF THE INVENTION

1. Field of the Invention

This invention pertains to a flexible clip assembly with panel thickness adjustment wings and a snap together latching configuration. The flexible clip assembly is used to engage cylindrical devices to structural panels. A second embodiment is a rod end clip with panel thickness adjustment wings.

2. Description of the Prior Art

In the prior art, several configurations have been used to engage cylindrical devices to a structural panel.

However, prior configurations have not allowed for a quick, reliable and simple attachment so as to engage or latch to the cylindrical device. Particularly, some prior art configurations have not provided a high resistance to relative sliding movement of the mating members of the latching configuration.

Similarly, prior configurations have not allowed for a quick, reliable and simple attachment so as to engage the structural panel, particularly if the panel has an expected range of thicknesses.

Examples of the prior art include U.S. Pat. No. 5,178,479 issued on Jan. 12, 1993 to Brown et al. which discloses a right angled rod retainer clip; U.S. Pat. No. 5,336,028 issued on Aug. 9, 1994 to Yamamoto which discloses a screw assembly for an actuating rod; U.S. Pat. No. 4,482,265 issued on Nov. 13, 1984 to Koza which discloses an actuator fastener for a cylindrical configuration; and U.S. Pat. No. 4,915,557 issued on Apr. 10, 1990 to Stafford which discloses an assembly for retaining a screw.

Other examples of prior art include U.S. Pat. No. 5,037,259 to Duran et al.; U.S. Pat. No. 4,934,888 to Corsmeier et al.; U.S. Pat. No. 4,591,285 to Nelson; and U.S. Pat. No. 4,406,557 to Suzuki et al.

OBJECTS AND SUMMARY OF THE INVENTION

It is therefore an object of this invention to provide a device for engaging a cylindrical device with a quick, simple and reliable latching configuration.

It is therefore a further object of this invention to provide a device for engaging a cylindrical device wherein the mating members of the latching configuration are resistant to lateral sliding movement of the mating members.

It is therefore a still further object of this invention to provide a device for engaging a panel, particularly a panel with an expected range of thicknesses.

These and other objects are attained by a first embodiment of the present invention which includes a cylindrical structure with an unjoined portion along a longitudinal section of the periphery. A first mating element extends from a first side of the unjoined portion and a second mating element extends from a second side of the unjoined portion. Each mating element includes a lateral female connector longitudinally adjacent to a lateral male connector. In the mated or connected position, the female connector of the first mating element laterally engages the male connector of the second mating element while the lateral female connector of the second mating element laterally engages the male connector of the first mating element. First and second panel thickness adjustment wings are placed circumferentially adjacent to the first and second mating elements. Panel thickness adjustment wings have a partial circular or cylindrical shape and flex inwardly to engage a panel of a range of thicknesses against detent portions of mounting prongs on the mating elements.

These and other objects are similarly attained by a second embodiment of the present invention which includes a planar portion with a first end and a second end. The first end includes a prong to be engaged by an aperture in a panel. The body includes panel thickness adjustment wings of partial circular or cylindrical shape to engage a panel of a range of thicknesses. The second end includes a clip for engaging a cable or similar cylindrical device.

BRIEF DESCRIPTION OF THE DRAWINGS

Further objects and advantages of the invention will become apparent from the following description and claims, and from the accompanying drawngs, wherein:

FIG. 1 is a perspective view of the first embodiment, a clip assembly, of the present invention.

FIG. 2 is a side plan view of the first embodiment of the present invention with the mating elements not engaged.

FIG. 3 is a side plan view of the first embodiment of the present invention with the mating elements engaged.

DETAILED DESCRIPTION OF THE PREFERRED EMBODIMENTS

Figure 4:
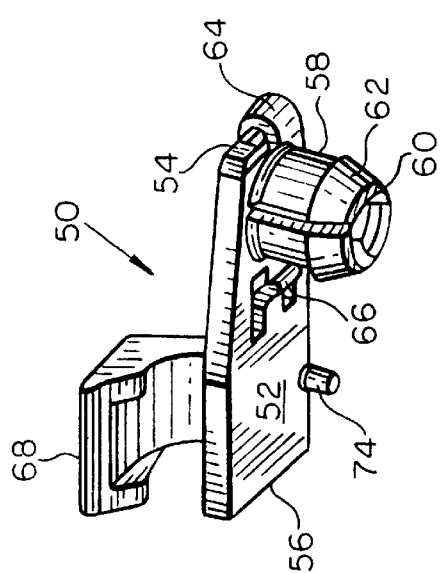
FIG. 4 is a perspective view of the second embodiment, a rod end clip, of the present invention.
Figure 7:
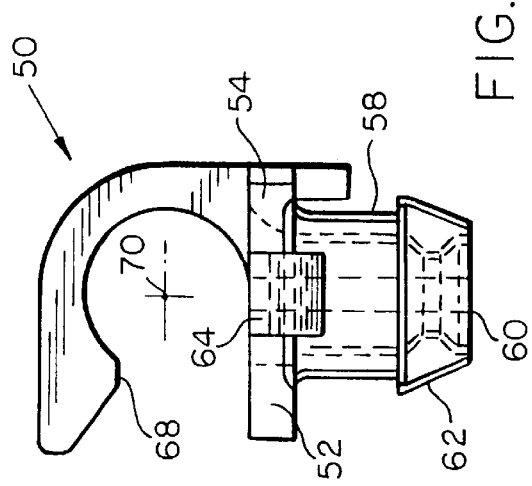
FIG. 7 is a side plan view of the second embodiment of the present invention.
Figure 6:
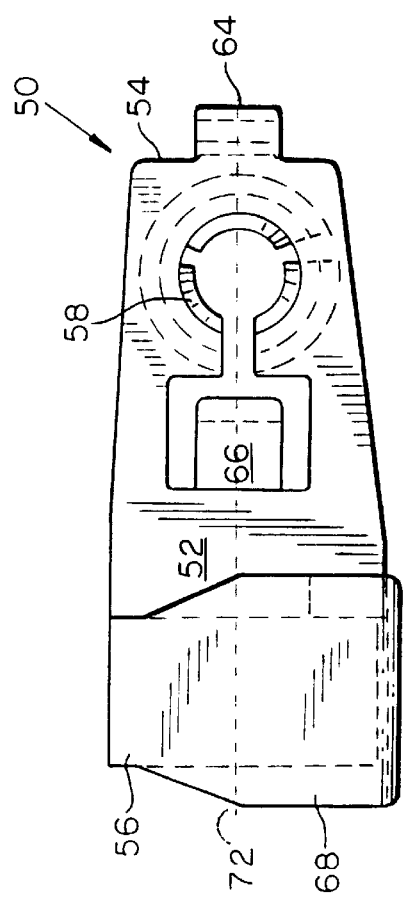
FIG. 6 is a top plan view of the second embodiment of the present invention.

Referring now to the drawings in detail wherein like numerals indicate like elements throughout the several views, one sees that FIG. 1 is a perspective view of the first embodiment of the present invention, clip assembly 10.

Clip assembly 10 is typically an integral one-piece construction of plastic or similar elastic material.

Clip assembly 10 includes a hollow cylindrical portion 12 to secure to a grommet (not shown) or similar cylindrical device. Hollow cylindrical portion 12 includes an unjoined section 14 along a longitudinal portion of the periphery thereof. Unjoined section 14 is bounded by first peripheral end 16 and second peripheral end 18 of hollow cylindrical portion 12. First mating element 20 extends substantially radially from first peripheral end 16 while second mating element 22 extends substantially radially from second peripheral end 18. As shown in FIG. 2, in the open or unmated configuration, first mating element 20 and second mating element 22 flex away from each other and hence flex somewhat away from a radial position. However, as shown in FIG. 3, in the closed or mated configuration, first mating element 20 and second mating element 22 are secured to each other in a radial location with respect to the hollow cylindrical portion 12.

As shown in FIG. 1, distal end 24 of first mating element 20 includes a first open hollow semi-cylindrical female lateral mating connector 26 which is longitudinally adjacent to a first solid semi-cylindrical male lateral mating connector 28. First open hollow semi-cylindrical female lateral mating connector 26 and first solid semi-cylindrical male lateral mating connector 28 share a common longitudinal axis.

Similarly, distal end 30 of second mating element 22 includes a second open hollow semi-cylindrical female lateral mating connector 32 which is longitudinally adjacent to a second solid semi-cylindrical male lateral mating connector 34. Second open hollow semi-cylindrical female lateral mating connector 32 and second solid semi-cylindrical male lateral mating connector 34 share a common longitudinal axis.

First open hollow semi-cylindrical female lateral mating connector 26 and first solid semi-cylindrical male lateral mating connector 28 are in a first longitudinal order while second open hollow semi-cylindrical female lateral mating connector 32 and second solid semi-cylindrical male lateral mating connector 34 are in a second longitudinal order which is the reverse of the first longitudinal order. Therefore, in the engaged or mated position of first and second mating elements 20, 22 as shown in FIG. 3, first open hollow semi-cylindrical female lateral mating connector 26 engages or mates with second solid semi-cylindrical male lateral mating connector 34 while second open hollow semi-cylindrical female lateral mating connector 32 engages or mates with first solid semi-cylindrical male lateral mating connector 28. This configuration prevents any relative sliding of the first and second mating elements 20, 22.

Distal ends 24, 30 of first and second mating elements 20, 22 further include mounting prongs 36, 38, respectively, extending upwardly (in the orientation of FIGS. 2 and 3) at an acute angle thereto. The upper ends 40, 42 of mounting prongs 36, 38 include detent ridges 44, 46, respectively, for mounting clip assembly 10 into a slot in a structural panel (not shown).

Upwardly circumferentially adjacent to first and second mating elements 20, 22 on the periphery of hollow cylindrical portion 12 are downwardly extending semi-cylindrical panel thickness adjustment wings 48, 49, respectively. Panel thickness adjustment wings 48, 49 are used to urge a panel of various thicknesses against detent ridges 44, 46 of mounting prongs 36, 38. The flexible characteristics of the panel thickness adjustment wings 48, 49 allow for mounting clip assembly 10 to structural panels of a range of thicknesses.

To use the clip assembly 10, the user engages a grommet (not shown) or other cylindrical device within hollow cylindrical portion 12. If necessary, this can be done by spreading first and second mating elements 20, 22 apart. The user then urges first and second mating elements 20, 22 together so that, as shown in FIG. 3, first open hollow semi-cylindrical female lateral mating connector 26 engages or mates with second solid semi-cylindrical male lateral mating connector 34 while second open hollow semi-cylindrical female lateral mating connector 32 engages or mates with first solid semi-cylindrical male lateral mating connector 28. Detent edges 44, 46 of mounting prongs: 36, 38 engage a slot in the structural panel (not shown) to which the clip assembly 10 is attached. Additionally, panel thickness adjustment wings 48, 49 urge the panel downwardly against detent edges 44, 46.

Figure 5:
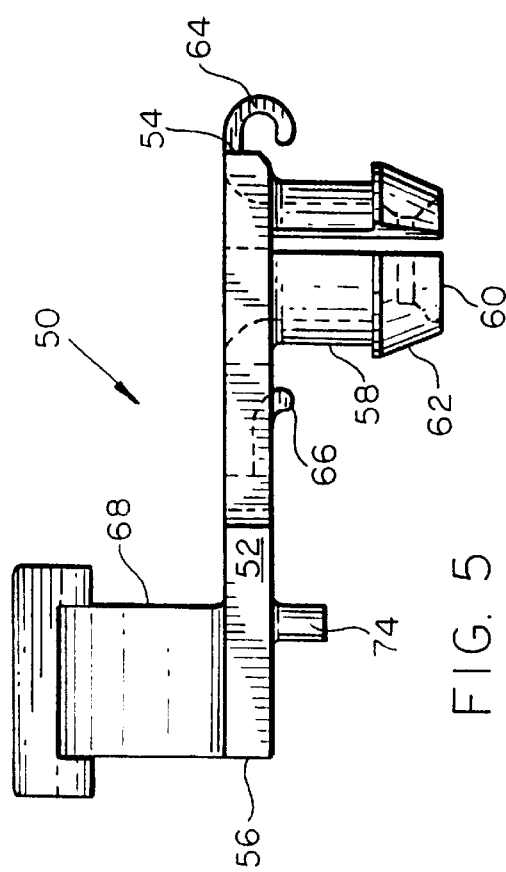
FIG. 5 is a front plan view of the second embodiment of the present invention.

Referring now to FIG. 4, one sees a perspective view of the second embodiment of the present invention, rod end clip 50. FIG. 5 shows a front plan view of the rod end clip 50.

Rod end clip 50 is typically an integral one-piece construction of plastic or similar elastic material.

Rod end clip 50 includes a planar body 52 with a first end 54 and a second end 56. Immediately inwardly adjacent from first end 54 is downwardly extending cylindrical segmented prong 58. The distal end 60 of cylindrical segmented prong 58 includes detent enlargement 62.

First end 54 of planar body 52 further includes first downwardly extending semi-cylindrical panel thickness adjustment wing 64. Similarly, second downwardly extending semi-cylindrical panel thickness adjustment wing 66 is positioned inwardly adjacent from cylindrical segmented prong 58.

Downwardly extending cylindrical segmented prong 58 is used to engage an aperture of a relatively specific diameter in a structural panel (not shown). However, in order to compensate for a range of panel thicknesses, first and second downwardly extending semi-cylindrical panel thickness adjustment wings 64, 66 urge the panel downwardly to engage detent enlargement 62 securely.

As shown in FIGS. 4–7, the second end 56 of planar body 52 includes a semi-cylindrical clip 68 formed about a longitudinal axis 70 parallel to and spaced above a longitudinal axis 72 of planar body 54. Semi-cylindrical clip 68 is used to engage a cylindrical device, typically a cable (not shown) in a routing position.

As shown in FIGS. 4 and 5, a bottom side of planar body 52 inwardly adjacent of second end 56 includes downwardly extending positioning pin 74. Positioning pin 74 may be in various locations depending upon the application and the structural panel to which rod end clip 50 is to be secured.

To use rod end clip 50, the user positions downwardly extending cylindrical segmented prong 58 into an aperture in the structural panel. The downwardly extending semi-cylindrical panel thickness adjustment wings 64, 66 are then used to compensate for variations in thickness of the panel by urging the panel against detent enlargement 62. The user then positions semi-cylindrical clip 68 about the cylindrical device, typically a cable (not shown) in a routing position.

Thus the several aforementioned objects and advantages are most effectively attained. Although preferred embodiments of the invention have been disclosed and described in detail herein, it should be understood that this invention is in no sense limited thereby and its scope is to be determined by that of the appended claims.

What is claimed is:

1. A clip assembly apparatus comprising:

a hollow cylindrical portion for engaging a cylindrical object, a periphery of said hollow cylindrical portion including an unjoined portion, said unjoined portion including a first peripheral end and a second peripheral end;

a first mating element extending from said first peripheral end;

a second mating element extending from said second peripheral end;

said first mating element including a first distal end with a first female mating connector longitudinally adjacent to a first male mating connector, said first female mating connector being at least a partially cylindrical hollow element with a lateral opening and said first male mating connector being at least a partially cylindrical element, said first female mating connector and said first male mating connector being formed along a first common longitudinal axis;

said second mating element including a second distal end with a second female mating connector adjacent to a second male mating connector, said second female mating connector being at least a partially cylindrical hollow element with a lateral opening and said second male mating connector being at least a partially cylindrical element said second female mating connector and said second male mating connector being formed along a second common longitudinal axis;

wherein when said first mating element is urged against said second mating element, said first female mating connector engages said second male mating connector and said second female mating connector engages said first male mating connector.

2. The clip assembly apparatus of claim 1 wherein said first female mating connector and said first male mating connector are arranged in a first order along said first common longitudinal axis, and said second female mating connector and said second male mating connector are arranged in a second order along said second common longitudinal axis, said second order being a reverse of said first order.

3. The clip assembly apparatus of claim 2 wherein when said first mating element is mated to said second mating element, said first and second mating elements extend radially from said hollow cylindrical portion, and when said first mating element is free of mating to said second mating element, said first and second mating elements flex away slightly from a radial position with respect to said hollow cylindrical portion.

4. The clip assembly apparatus of claim 3 wherein a first mounting prong extends from said first distal end of said first mating element and a second mounting prong extends from said second distal end of said second mating element.

5. The clip assembly apparatus of claim 4 wherein said first mounting prong and said first mating element form a first acute angle and said second mounting prong and said second mating element form a second acute angle, said first acute angle and said second acute angle being substantially equal.

6. The clip assembly apparatus of claim 5 wherein said first mounting prong includes a first detent ridge on a free end thereof, and said second mounting prong includes a second detent ridge on a free end thereof.

7. The clip assembly apparatus of claim 6 further including first and second at least partially cylindrical panel engagement devices peripherally adjacent to said first and second mating elements, respectively, said panel engagement devices flexing to engage panels of a range of thicknesses against said first and second detent ridges.

8. A clip assembly apparatus comprising:

a hollow cylindrical portion for engaging a cylindrical object, a periphery of said hollow cylindrical portion including an unjoined portion, said unjoined portion including a first peripheral end and a second peripheral end;

a first mating element extending from said first peripheral end, said first mating element includes a first distal end with a first female mating connector longitudinally adjacent to a first male mating connector, said first female mating connector being at least a partially cylindrical hollow element with a lateral opening and said first male mating connector being at least a partially cylindrical element, said first female mating connector and said first male mating connector being formed along a first common longitudinal axis;

a second mating element extending from said second peripheral end, said second mating element includes a second distal end with a second female mating connector longitudinally adjacent to a second male mating connector, said second female mating connector being at least a partially cylindrical hollow element with a lateral opening and said second male mating connector being at least a partially cylindrical element, said second female mating connector and said second male mating connector being formed along a second common longitudinal axis;

first and second at least partially cylindrical panel engagement devices peripherally adjacent to said first and second mating elements, respectively, said panel engagement devices flexing to engage panels of a range of thicknesses wherein when said first mating element is urged against said second mating element, said first female mating connector engages said second male mating connector and said second female mating connector engages said first male mating connector.

9. The clip assembly apparatus of claim 8 wherein said first female mating connector and said first male mating connector are arranged in a first order along said first common longitudinal axis, and said second female mating connector and said second male mating connector are arranged in a second order along said second common longitudinal axis, said second order being a reverse of said first order.

10. The clip assembly apparatus of claim 9 wherein when said first mating element is mated to said second mating element, said first and second mating elements extend radially from said hollow cylindrical portion, and when said first mating element is free of mating to said second mating element, said first and second mating elements flex away slightly from a radial position with respect to said hollow cylindrical portion.

* * * * *